US008370338B2

(12) United States Patent
Gordo et al.

(10) Patent No.: US 8,370,338 B2
(45) Date of Patent: Feb. 5, 2013

(54) LARGE-SCALE ASYMMETRIC COMPARISON COMPUTATION FOR BINARY EMBEDDINGS

(75) Inventors: Albert Gordo, Barcelona (ES); Florent Perronnin, Domène (FR)

(73) Assignee: Xerox Corporation, Norwalk, CT (US)

( * ) Notice: Subject to any disclaimer, the term of this patent is extended or adjusted under 35 U.S.C. 154(b) by 32 days.

(21) Appl. No.: 12/960,018

(22) Filed: Dec. 3, 2010

(65) Prior Publication Data

US 2012/0143853 A1    Jun. 7, 2012

(51) Int. Cl.
    G06F 17/30    (2006.01)
(52) U.S. Cl. .................................. 707/723; 707/737
(58) Field of Classification Search ............... 707/737, 707/763, 3, 6, 2, 104, 719
See application file for complete search history.

(56) References Cited

U.S. PATENT DOCUMENTS

| 6,182,069 | B1 * | 1/2001 | Niblack et al. ................. 1/1 |
| 6,675,174 | B1 * | 1/2004 | Bolle et al. ..................... 1/1 |
| 7,283,987 | B2 * | 10/2007 | Cha et al. ....................... 1/1 |
| 7,725,484 | B2 * | 5/2010 | Nister et al. ................. 707/763 |
| 7,966,327 | B2 * | 6/2011 | Li et al. ...................... 707/737 |
| 2007/0005356 | A1 | 1/2007 | Perronnin |
| 2007/0033170 | A1 * | 2/2007 | Sull et al. ..................... 707/3 |
| 2007/0258648 | A1 | 11/2007 | Perronnin |
| 2008/0069456 | A1 | 3/2008 | Perronnin |
| 2009/0144033 | A1 | 6/2009 | Perronnin et al. |
| 2010/0092084 | A1 | 4/2010 | Perronnin et al. |
| 2010/0098343 | A1 | 4/2010 | Perronnin et al. |
| 2010/0114871 | A1 * | 5/2010 | Cheong et al. ............... 707/719 |
| 2011/0142335 | A1 * | 6/2011 | Ghanem et al. .............. 382/165 |

OTHER PUBLICATIONS

Indyk, et al., "Approximate nearest neighbors: towards removing the curse of dimensionality," in STOC '98: Proc. 30th annual ACM Symp. on Theory of Cumputing, pp. 604-613 (ACM New York, NY, USA, 1998).
Charikar, "Similarity estimation techniques from rounding algorithms," in ACM Symp. on Theory of Computing (2002).
Weiss, et al., "Spectral hashing," in Neural Information Processing Systems (hereinafter *NIPS*) (2008).
Kulis, et al., "Kernelized locality-sensitive hashing for scalable image search," in Proc. 12th Int'l Conf. on Computer Vision (2009).
Raginsky, et al., "Locality-sensitive binary codes from shift-invariant kernels," in NIPS (2009).
Wang, et al., "Semi-supervised hashing for large scale search," in IEEE Conf. on Computer Vision & Pattern Recognition (Jun. 2010).
Zheng, et al. , "Tour the World: Building a web-scale landmark recognition engine," IEEE Computer Society Conference, 2009.

(Continued)

*Primary Examiner* — James Trujillo
*Assistant Examiner* — Thong Vu
(74) *Attorney, Agent, or Firm* — Fay Sharpe LLP

(57) ABSTRACT

A system and method for comparing a query object and one or more of a set of database objects are provided. The method includes providing quantized representations of database objects. The database objects have each been transformed with a quantized embedding function which is the composition of a real-valued embedding function and a quantization function. The query object is transformed to a representation of the query object in a real-valued embedding space using the real-valued embedding function. Query-dependent estimated distance values are computed for the query object, based on the transformed query object and stored. A comparison (e.g., distance or similarity) measure between the query object and each of the quantized database object representations is computed based on the stored query-dependent estimated distance values. Data is output based on the comparison computation.

22 Claims, 7 Drawing Sheets

OTHER PUBLICATIONS

Jegou, et al. "Improving Bag-Of-Features for Large Scale Image Search," in IJCV, 2010.

Rahimi, et al., "Random features for large-scale kernel machines," in *NIPS*, 2007.

NIST Structured Forms dataset (NIST Structured Forms Database (NIST Special Database 2), available at www.nist.gov/ts/msd/srd/nistsd2.cfm.

Dong, et al. "Asymmetric distance estimation with sketches for similarity search in high-dimensional spaces," in *SIGIR*, 2008.

Jegou, et al. "Product quantization for nearest neighbor search," *IEEE Transactions on Pattern Analysis and Machine Intelligence*, 99, 2010.

U.S. Appl. No. 12/541,636, filed Aug. 14, 2009, Perronnin, et al.
U.S. Appl. No. 12/512,209, filed Jul. 30, 2009, Perronnin, et al.
U.S. Appl. No. 12/252,531, filed Oct. 16, 2008, Perronnin, et al.

\* cited by examiner

LARGE-SCALE ASYMMETRIC COMPARISON COMPUTATION FOR BINARY EMBEDDINGS

BACKGROUND

The exemplary embodiment relates to comparison of database objects based on representations of the objects and finds particular application in the retrieval of images from a database in response to a query image.

To compare digital objects, such as images, a representation of one object (the query object) can be generated, which can then be compared with a set of similarly generated representations of database objects in order to find the most similar. These representations may be referred to as signatures since they represent the respective objects. In the case where the objects are document images, they may be represented by runlength histograms (vectorial representations) or other representations generated by various description techniques. For example, it could be useful to be able to retrieve scanned images of a particular structured form which have been filled in and submitted by users. In this case, the query object may be a representation of a template (blank) version of the form and the database could include representations of a large collection of scanned documents, potentially including scanned images of particular form.

Such a comparison process may entail computing the similarity between one query object and a very large number (millions or even hundreds of millions) of database objects. When dealing with a large number of database objects, two issues may be considered. The first is the computational cost. To reduce the cost, the similarity between two objects should be computed efficiently. The second consideration is the memory cost. Ideally, the memory footprint of the database objects should be small enough so that all objects fit into the memory storage (RAM) of a computer performing the comparison. If this is not the case, a significant portion of the dataset may have to be stored on external/removable memory, such as a disk. As a result, the response time of a query can be too long because the disk access is much slower than that of RAM access. Although solid state disks (SSD) can be as fast as RAM, they tend to be costly, which limits their deployment.

For example, even when relatively small descriptors of 1,680 dimensions are used (e.g., in the case of runlength histograms as document representations) and encoded on 4B floating point values, each document signature takes 6720B and a million documents would need approximately 6.23 GB of memory storage.

To address these two interrelated issues, several binary embedding techniques have been proposed: the image signatures are transformed into a binary space where the Hamming distance (which counts the number of dissimilar bits in two binary signatures) makes sense. The compression results in a binary representation of an image without losing the ability to retrieve visually similar images. See, for example, P. Indyk, et al., "Approximate nearest neighbors: towards removing the curse of dimensionality," in STOC '98: Proc. 30th annual ACM Symp. on Theory of Computing, pp. 604-613 (ACM New York, N.Y., USA, 1998); M. Charikar, "Similarity estimation techniques from rounding algorithms," in ACM Symp. on Theory of Computing (2002); Y. Weiss, et al., "Spectral hashing," in Neural Information Processing Systems (hereinafter *NIPS*) (2008); B. Kulis, et al., "Kernelized locality-sensitive hashing for scalable image search," in Proc. 12th Int'l Conf. on Computer Vision (2009); M. Raginsky, et al., "Locality-sensitive binary codes from shift-invariant kernels," in NIPS (2009); J. Wang, et al., "Semi-supervised hashing for large scale search," in IEEE Conf. on Computer Vision & Pattern Recognition (June 2010).

Binary embeddings address both the computational and memory issue. The Hamming distance $Ha(a,b)$ between two binary signatures a and b may be computed efficiently using binary operations and look-up tables. Also, the memory footprint can be drastically reduced. These techniques suffer from a major disadvantage. They require compression of the query object so that the query object is in the same space as the database object representations. Therefore, there is a loss of information when the query object is compressed.

The exemplary embodiment addresses this problem and others with an asymmetric embedding approach in which the loss of information on the query side can be reduced while maintaining the benefits of a quantized compression (e.g., binary embedding) on the database side.

INCORPORATION BY REFERENCE

The following references, the disclosures of which are incorporated herein by reference in their entireties, are mentioned:

The following references disclose methods for obtaining a real value representation of an object, such as an image: U.S. Pub. No. 20100092084, published Apr. 15, 2010, entitled REPRESENTING DOCUMENTS WITH RUNLENGTH HISTOGRAMS, by Florent Perronnin, et al.; U.S. Pub. No. 20070005356, published Jan. 4, 2007, entitled GENERIC VISUAL CATEGORIZATION METHOD AND SYSTEM, by Florent Perronnin; U.S. Pub. No. 20070258648, published Nov. 8, 2007, entitled GENERIC VISUAL CLASSIFICATION WITH GRADIENT COMPONENTS-BASED DIMENSIONALITY ENHANCEMENT, by Florent Perronnin; U.S. Pub. No. 20080069456, published Mar. 20, 2008, entitled BAGS OF VISUAL CONTEXT-DEPENDENT WORDS FOR GENERIC VISUAL CATEGORIZATION, by Florent Perronnin; U.S. Pub. No. 20090144033 published Jun. 4, 2009, by Florent Perronnin and Yan Liu; U.S. Pub. No. 20100098343, published Apr. 22, 2010, by Florent Perronnin and Yan Liu; U.S. application Ser. No. 12/512,209, filed Jul. 30, 2009, entitled COMPACT SIGNATURE FOR UNORDERED VECTOR SETS WITH APPLICATION TO IMAGE RETRIEVAL, by Florent Perronnin and Hervé Poirier; Yan-Tao Zheng, Ming Zhao, Yang Song, H. Adam, U. Buddemeier, A. Bissacco, F. Brucher, Tat-Seng Chua, and H. Neven, "Tour the World: Building a web-scale landmark recognition engine," IEEE Computer Society Conference, 2009 (hereinafter "Zheng, et al."), discloses a method for building a recognition engine for landmarks.

Herve Jegou, Matthijs Douze, and Cordelia Schmid, "Improving Bag-Of-Features for Large Scale Image Search," in IJCV, 2010 (hereinafter "Jegou, et al."), discloses a method for large scale image search by analyzing the bag-of-features approach.

BRIEF DESCRIPTION

In accordance with one aspect of the exemplary embodiment, a method for comparing a query object and a set of database objects includes providing quantized representations of database objects which have each been transformed with a quantized embedding function which is the composition of a real-valued embedding function and a quantization function. The query object is transformed to a representation in a real-valued embedding space using the real-valued embedding function. Computed query-dependent estimated distance values for the query object, based on the transformed query object, are stored. A comparison measure between the query object and each of the quantized database object representations is computed in the real-valued space based on the stored query-dependent estimated distance values. Data based on the comparison computation is output.

In accordance with another aspect of the exemplary embodiment, a computer-implemented system for comparing a query object and a set of database objects includes memory which stores a set of database objects which have each been transformed with a quantized embedding function which is the composition of a real-valued embedding function and a quantization function. An input receives a query object. A representation generation component transforms the query object to a representation in a real-valued intermediate space using the real-valued embedding function. Memory stores a set of computed query-dependent estimated distance values based on the transformed query object. Instructions are stored in memory for computing a comparison measure between the query object and each of the quantized database objects based on the stored query-dependent estimated distance values. A processor executes the instructions.

In accordance with another aspect, a method for comparing digital objects includes generating a query object representation for a query object in a real-valued space using real-valued embedding functions, converting a quantized representation of a database object into an estimated database object representation in the real-valued space, and computing a comparison measure between the query object and the database object in the real-valued space based on the estimated database object representation.

DETAILED DESCRIPTION

Aspects of the exemplary embodiment relate to a system and method for asymmetric comparison (similarity or distance) computation between a query object and a set of database objects that have been embedded in a quantized embedding space, such as a binary space in the case of binary embeddings. The method includes computing a comparison measure (e.g., a similarity or a distance) between the query object, embedded in an intermediate, real-valued embedding space, and each of the set of database objects embedded in the quantized embedding space.

While the exemplary embodiment is described in connection with images, such a forms, as query objects, it is to be appreciated that the method is applicable to a wide range of other objects, such as photographs, text, audio, video, combinations thereof, and the like. Additionally, while runlength histograms are used as examples of how such images may be represented in the original space, an object may be suitably represented by a sequence of vectors, a tree, a graph, or the like. Further, while the quantized (finite-valued) embedding space may be referred to as a binary embedding space, other quantized embedding spaces (e.g., ternary representations) are also contemplated.

Figure 1:
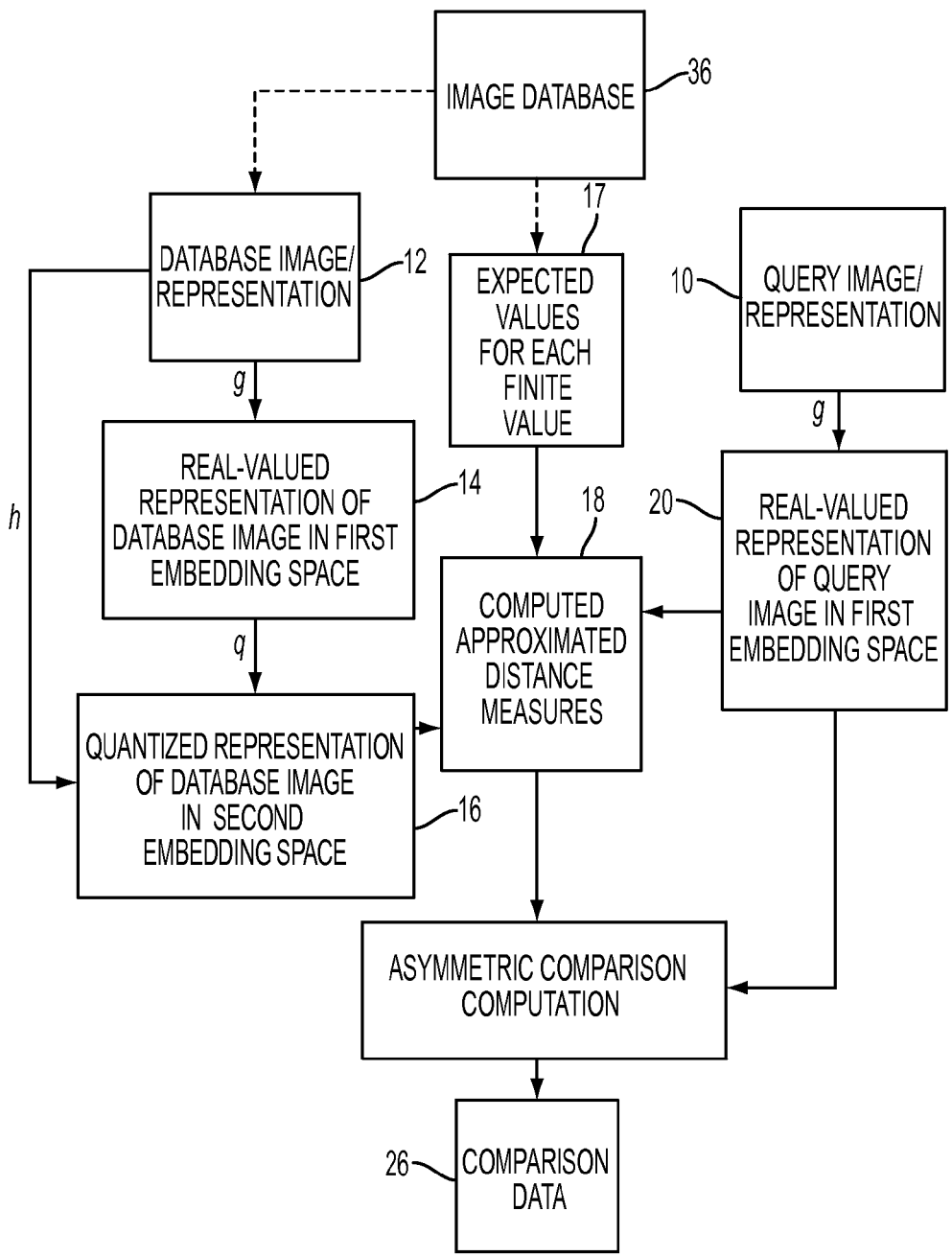
FIG. 1 is an overview of the exemplary method.

Briefly, as illustrated in FIG. 1, the exemplary method computes an asymmetric distance between a query object 10 (e.g., an image or representation thereof) and one (or multiple) database object(s) 12 (e.g., images or representations thereof). In the exemplary embodiment a query object and its representation in an original space ("original representation") may both be referred to herein as a "query object" for convenience. Similarly, a database object and its representation in an original space may both be referred to herein as a "database object." The method includes an offline stage (i.e., prior to the submission of a query object) and an online stage. Offline, the method includes binarizing each database image 12 through a set of binary embedding functions $h_k$, k=1, ..., K, each of which is the composition of a real-valued embedding function $g_k$ (yielding a real-valued representation 14) and a binary quantization function $q_q$ to generate a binary representation 16. A set of query-independent expectation values 17 (for $g_k$ given $h_k$) may also be pre-computed from a training set of objects in the intermediate real-valued space. Online, when a query object 10 is received, the method includes transforming the query object into a representation 20 in the real-valued intermediate embedding space using the set of real-valued embedding functions $g_k$, k=1, ..., K. A set of query-dependent expected distance (or similarity) values 18 (one for each database object 12) may be computed using the set of query-independent expected values 17 and transformed query object 20 and stored in a look-up table or tables (which can comprise any suitable data structure(s)). Alternatively, a set of query-dependent lower-bound distance (or similarity) values 18 (one for each database object 12) may be computed using the transformed query object 20 and stored in a look-up table or tables. The distance between the query object real-valued representation 20 and each binarized database object 16 can then be computed in the real-valued space using the stored look-up table(s).

The system and method find application in the field of information retrieval. For example, given a query object 10, it ranks the database objects 12 from closest to farthest. The output of the method can thus be a ranking of the database objects 12 or may be a set of database objects, such as one or a small group of database objects, which are similar to (or different from) the query object 10. However, the method may find application in other situations such as nearest neighbor or kernel classification, kernel density estimation, and kernel clustering.

In the exemplary embodiment, object signatures are compressed as quantized embeddings 16 on the database side but not on the query side. The exemplary embodiment takes advantage of the observation that many binary embedding techniques first embed the uncompressed signatures in an intermediate real-valued space in which there exists a suitable measure of similarity. The methods disclosed herein are thus not limited to a specific binary embedding algorithm h. The learning, if any, of the embedding functions g, q need not be modified, which simplifies deployment of the method. Additionally, especially for high compression rates, the exemplary asymmetric framework results in a large increase of the accuracy over purely binary techniques.

The exemplary process of embedding converts an object 10, 12 such as an image, or a representation thereof in an original space, into a set of descriptors in an embedding space. A "real-valued embedding space," as used herein, refers to a space in which each representation of an object (e.g., a query object 10) embedded in this space is composed of a set of real-valued descriptors, where each descriptor can assume real values and is not limited to a small, finite set of values, such as two values in the case of a binary valued embedding space. By way of example, the descriptors of a real value representation of an object may be encoded as n-byte values where n can be, for example, from 4-10, e.g., 4 byte floating point values. As will be appreciated, the real-valued descriptor is still expressed as a binary number, for computing purposes.

By a "quantized embedding space" it is meant that each representation of an object (here a database object 12) which is embedded in this space is composed of a set of finite-valued descriptors which are all limited to a predetermined small set of values, such as from 2 to 4 values. In the following description, reference is made to a binary space (two possible values) as the quantized embedding space although it is to be appreciated that the method can readily be extended to other quantized embedding spaces, such as ternary or quaternary embedding spaces, and the like.

By "asymmetric comparison computation" it is meant that a similarity/distance is computed between an uncompressed representation 20 of a query object 10 in a first, real-valued embedding space and a compressed representation 16 of a database object in a second, quantized valued embedding space. The comparison is performed in the real-valued embedding space As used herein an "object" can be any digital data structure, such as an image, text file, audio file, combination thereof, or the like for which an original representation of the object can be generated based on features extracted from the object. Input objects (or their original representations) may be stored in data memory during processing. Images, as used herein, may be pictorial images, such as graphical images, photographs or video images, scanned images, such as scanned handwritten or typed documents, combined images which include photographs along with text, and/or graphics, or the like. The images may be received in JPEG, GIF, JBIG, BMP, TIFF or other common file format used for images and which may optionally be converted to another suitable format prior to processing. In the case of an image, the features can be related to pixel color, where color can be expressed in a color space defined by one or more color channels, such as gray level, RGB, CMYK, L*a*b*, or the like. Color-based features can refer to any aspect of color which may be specified, including, but not limited to, absolute color values, such as hue, chroma, and lightness, and relative color values, such as differences in hue, chroma, and lightness, which may be expressed as color gradients. For example, the color may be characterized by one, two, or all three of the red, green, and blue pixel coordinates in an RGB color space representation, or by one, two, or all three of the L, a, and b pixel coordinates in an Lab color space representation, or by one or both of the x and y coordinates of a CIE chromaticity representation, or so forth. In the case of text documents, the features can be based on extracted words or subparts of words. In the case of audio files, the features may be based on phonemes or the like. Representations of objects comprising two or more modalities, such as a representation of both the audio and video portion of a movie, are also contemplated. The terms query object and database object are used for convenience to distinguish the object to be compared and the objects with which it is being compared.

The term "pixel" as used herein is intended to denote "picture element" and encompasses image elements of two-dimensional images or of three-dimensional images.

The terms "optimization," "minimization," and similar phraseology are to be broadly construed as one of ordinary skill in the art would understand these terms. For example, these terms are not to be construed as being limited to the absolute global optimum value, absolute global minimum, and so forth. For example, minimization of a function may employ an iterative minimization algorithm that terminates at a stopping criterion before an absolute minimum is reached. It is also contemplated for the optimum or minimum value to be a local optimum or local minimum value.

Figure 2:
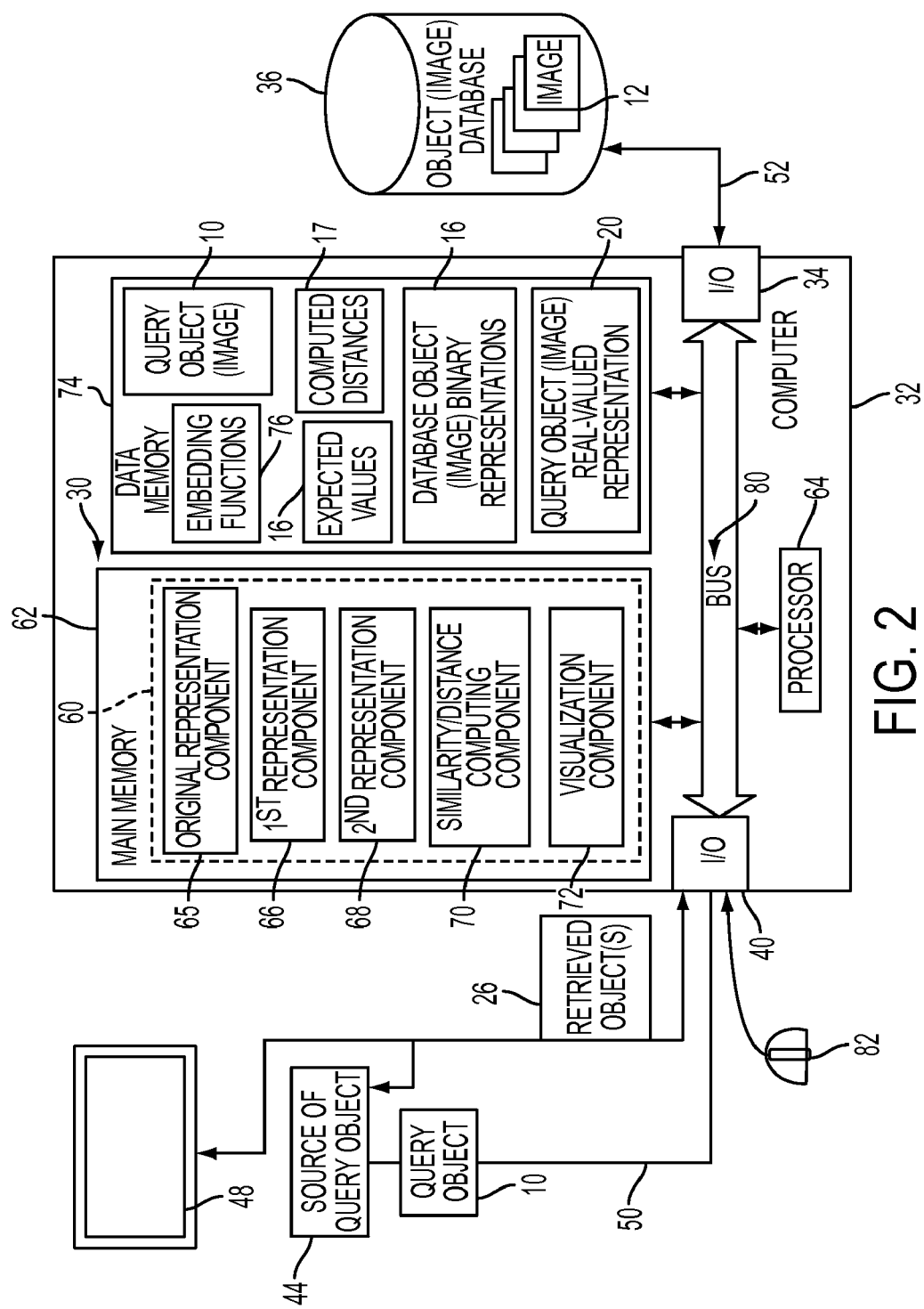
FIG. 2 is a functional block diagram of a system for object retrieval in accordance with one aspect of the exemplary embodiment.

With reference to FIG. 2, a functional block diagram of a system 30 for asymmetric similarity/distance computation is illustrated. The exemplary system 30 is embodied in one or more general or specific purpose computing devices 32, such as a server computer, PC, laptop computer, PDA, or any other computing device capable of implementing the method illustrated in FIG. 3.

The system 10 includes one or more input/output interfaces for communicating with external devices. For example, an interface 34 communicates with a database 36 which includes a set of database objects 12. The objects 12 may be images which each include an array of pixels, each pixel including one or more color values in a suitable color space or representations generated from features extracted from the objects, such as runlength histograms. The database 36 can be a single database or a set of databases and can be local to the system 30 or accessed remotely, e.g., via the Internet. An interface 40, which may be the same or separate from interface 34, receives, as input, a query object 10, such as an image. The query object 10 may be a user's object, such as from a user's collection of images, or may be a selected one of the objects 12 in the database 36. In the exemplary embodiment, the query object 10 is input to the system 10 from a source 44 of query objects, such as a user's computer, disk, memory stick, scanner, or from internal memory of the computing device 32.

The system 30 outputs data based on the asymmetric similarity computation, such as one or more retrieved objects 26 from the database 36, or data based thereon. The data 26 may be output to an output device. For example, data 26 is output to a computing device, such as the user's device 44, for display on a display screen 48, and/or may be output to another output device, such as a non-transitory memory storage device, a printer, or the like. Apparatus 32 may communicate with source 44 and database 36 via wired or wireless links 50, 52, such as a local area network or wide area network, such as the Internet.

With reference to FIGS. 1 and 2, exemplary system 30 includes a set 60 of object processing components, e.g., in the form of software instructions, stored in non-transitory main memory 62 for performing the exemplary method. Instructions 60 are executed by a processor 64, such as the CPU of the computing device 32, which is in communication with memory 62. The illustrated components 60 include an (optional) original representation component 65, which extracts a feature-based representation of a digital object 10, 12 in an original space. A first representation component 66 takes as input a digital object 10, 12 (or its original representation) and outputs a real value representation 20, 14 of the object embedded in a first, real value embedding space and a second representation component 68 takes as input a digital object 12 (or its real value representation 14 embedded in the first embedding space) and outputs a binary representation 16 of the object 12 in a second, binary embedding space (or other quantized embedding space). A comparison computing component 70 is configured for computing a similarity/distance between the representation 20 of the query object 10, in the first embedding space, and the representations 16 of the set of database objects 12 in the second embedding space. A visualization component 72 provides for generation of a graphical user interface on display device 48 for enabling user selection of query object 10 and/or for display of retrieved object(s) 26 responsive to the query.

Data memory 74 of the system 10 may store the binary representations 16 of the set of database objects 12 generated by the second representation component 68, as well as sets of embedding functions 76 (g, q), which are used for embedding objects 10, 12 into the first and second embedding spaces. For an expectation-based similarity/distance computation (described below), memory 74 may also store expected values 17 computed as average values for each dimension in the second embedding space, for each quantized value (0 and 1 in the binary case) as well as computed distances 18 to the expected values for the query object or lower bounds on the distance. Data memory 74 may also store the query object 10 and/or its real-valued representation 20.

Components 34, 40, 62, 64, 74 of the computer 32 are communicatively interconnected by a data/control bus 80.

The digital processor 64 can be variously embodied, such as by a single-core processor, a dual-core processor (or more generally by a multiple-core processor), a digital processor and cooperating math coprocessor, a digital controller, or the like. The computer 32 may include one or more dedicated or general purpose computing devices, such as a server computer or a desktop or laptop computer with an associated display device 48 and a user input device 82, such as a keyboard, and/or cursor control device such as a touch screen or mouse.

The memories 62, 74 may be separate or combined and may represent any type of computer readable medium such as random access memory (RAM), read only memory (ROM), magnetic disk or tape, optical disk, flash memory, or holographic memory. In one embodiment, the memory 62, 74 comprises a combination of random access memory and read only memory.

The term "software" as used herein is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

Figure 3:
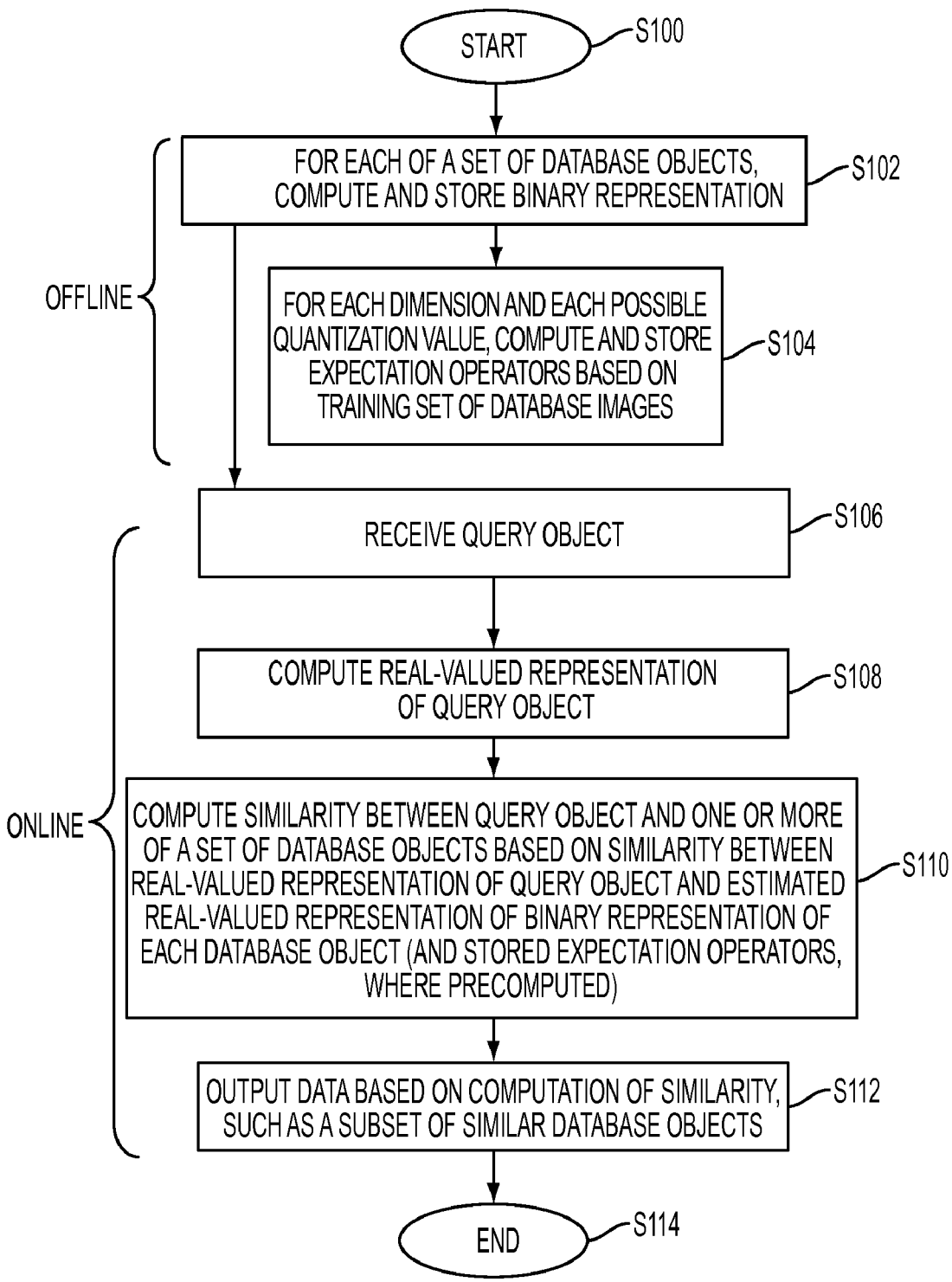
FIG. 3 is a flow diagram of a method for object retrieval in accordance with another aspect of the exemplary embodiment.

FIG. 3 is a flowchart which illustrates the exemplary method. The method begins at S100.

At S102, a quantized (e.g., binary) representation 16 is computed for each of a set of database objects 12, such as images. Each element ($h_k$, k=1, ..., K) of the binary representation 16 is the composition of a real-valued embedding function $g_k$ and a (binary) quantization function $q_k$. Binary representations 16 may be computed for a large number of database objects 12, such as thousands or millions of database objects, and the representations 16 stored remotely or locally to the system 30, e.g., in computer memory 74, such as RAM memory. If the database objects 12 have already been embedded in the quantization space, this step may be omitted.

At S104, a set of query-independent expected values ($\alpha$) 17 may be pre-computed from a training set of the objects in the intermediate, real-valued embedding space. The training set can be objects from database 36, i.e., from among the database objects 12, or can be taken from a different set of objects of the same general type, e.g., a dataset of images in the case of query images. In one embodiment, outlined below (lower bound based), the computation of expected values is not needed.

At S106, a query object 10, such as an image, is received and may be temporarily stored in memory 74. If the image 10 is in its native form, an original representation is generated.

At S108, an intermediate, real-valued representation 20 is computed for the query object 10. The real-valued representation 20 is solely derived from the set of real-valued embedding functions $g_k$ and does not use the binary (or any other finite-valued) quantization functions $q_k$. In one embodiment, described below, functions $q_k\bullet$ are computed by Locality Sensitive Hashing (LSH) and functions $g_k$ are random projections ($r'_k x$) of the original space query object (the dot product between the random direction $r_k$ and the input vector). In another embodiment, $q_k\bullet$ are computed by Spectral Hashing (SH) and the functions $g_k$ are of the form $\cos(a_k w'_k x)$ where $w_k$ is a principal direction of the data and $a_k$ is computed using the analytical form of Laplacian eigenfunctions. In another embodiment the $q_k$ functions are computed by Semi-supervised Hashing (SSH), and $g_k$ are projections on a set of learned vectors $w_k(w'_k x_i)$. In another embodiment, $q_k\bullet$ are computed by Locality-Sensitive Binary Codes (LSBC) and $g_k$ are cosine functions on shifted random projections ($\cos(w'_k x + b_k)$). In another embodiment, $q_k\bullet$ are computed by Principal Component Analysis Embedding (PCAE) and $g_k$ are projections of the mean-centered input vector on the principal directions of variation of the data ($w'_k(x-\mu)$).

At S110, an asymmetric similarity/distance computation is performed between the intermediate, real-valued representation 20 of the query object 10 and the binary representations 16 of the database objects in the set of database objects. In this step, a set of query dependent distance values 17 (β or γ) may be pre-computed as a function of the real-valued representation 20 computed at S108 and optionally of the query-independent expected values computed at S104. These query dependent distance values are stored in a look-up table (which can comprise any suitable data structure). The distance, in the real-valued space, between the query object and a binarized database object is computed using the look-up tables.

At S112, data 26 is output based on the asymmetric similarity/distance computation, such as a subset (fewer than all) of the database objects 12 which are computed to be most similar to the query object 10, or data based on this subset.

The method ends at S114.

The method illustrated in FIG. 3 may be implemented in a non-transitory computer program product that may be executed on a computer. The computer program product may be a non-transitory computer-readable recording medium on which a control program is recorded, such as a disk, hard drive, or the like. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

The computer program product may be integral with the computer 32, (for example, an internal hard drive or RAM), or may be separate (for example, an external hard drive operatively connected with the computer 32), or may be separate and accessed via a digital data network such as a local area network (LAN) or the Internet (for example, as a redundant array of inexpensive or independent disks (RAID) or other network server storage that is indirectly accessed by the computer 32 via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 3, or a portion thereof, can be used to implement the method described herein.

Examples of methods for deriving signatures which can be used as the original representations of the objects 10, 12 include those described in any one of above mentioned U.S. Pub. Nos. 2007/0005356; 2007/0258648; 2008/0069456; 2009/0144033; and U.S. Ser. No. 12/252,531. In one embodiment, the object representations may be generated elsewhere and a training set of labeled vectors input in place of the objects themselves. In an exemplary method, an image 10, 12, such as a scanned document, in which the pixel colorant values are quantized into a plurality of colorant quantization levels, is partitioned into regions, optionally at a plurality of different scales. For each region, a runlength histogram is computed, which may be a combination of sub-histograms for each of the colorant quantization levels and optionally each of plural directions. The runlength histograms, optionally normalized, can then be combined to generate an original representation of the respective document image. The original space may thus be composed by all possible 8B descriptor values which may be assumed by runlength histogram representations of images, or any other suitable real-valued representations. In the runlength method, runlength histograms are computed. As used herein, a runlength is the number of successive pixels in a given direction in a scanned image that belong to the same quantization interval e.g., there may be only two, black and white, or more than two quantization levels). Further details on this method are described in U.S. Pub. No. 20100092084, published Apr. 15, 2010, entitled REPRESENTING DOCUMENTS WITH RUNLENGTH HISTOGRAMS, by Florent C. Perronnin, the disclosure of which is incorporated herein by reference.

The exemplary method can be implemented with a variety of binary embedding techniques h. By way of example, several binary embedding techniques are illustrated below. For each binary embedding algorithm, a suitable comparison (similarity or distance) measure in the intermediate real-valued space is given. This is exploited with an appropriate asymmetric similarity/distance operating in the real-valued space for each binary embedding technique.

Notations

The following notations are used herein. Let x be an object 12 in an original space $\Omega$, such as a vector, and let $h_k$ be a binary embedding function, i.e. $h_k:\Omega\rightarrow\{0,1\}$. It will be appreciated that 0 and 1 are used to represent the two finite values in the binary embedding space, which can alternatively be described by the convention: $h_k:\Omega\rightarrow\{-1,+1\}$, or the like. As will be appreciated, for a quantized embedding space with three quantized values, the values may be $h_k:\Omega\rightarrow\{0,1,2\}$ or the like. In the following, u is a shorthand notation which represents a variable.

In the case of an image, for example, the original space $\Omega$ may be the space defined for the runlength histograms, optionally reduced in dimensionality by PCA. (if an original image is used rather than an original representation, the dimensionality may be much higher).

A set $H=\{h_k, k=1\ldots K\}$ of K functions defines a multidimensional embedding function h: $\Omega\rightarrow\{0,1\}^K$ with:

$$h(x)=[h_1(x),\ldots,h_K(x)]'$$

where the apostrophe ' designates the transposition operator. A binary embedding function $h_k$ can be decomposed as follows:

$$h_k(x)=q_k[g_k(x)], \qquad (1)$$

where $g_k: \Omega\rightarrow\mathbb{R}$, (kth real-valued embedding function),
$q_k: \mathbb{R}\rightarrow\{0,1\}$ (kth quantizing embedding function), and
$\mathbb{R}$ denotes a real number space.

Let g: $\Omega\rightarrow\mathbb{R}^K$ denote by a set of embedding functions:

$$g(x)=[g_1(x),\ldots,g_K(x)]'.$$

Given two objects x and y to be compared (x may be a query object 10 and y a database object 12), it will now be shown that for many binary embedding techniques, there is suitable measure of similarity/distance between g(x) and g(y). Examples of such similarity measures include the dot product and the Euclidean distance. In the exemplary embodiment, this property is taken advantage of for the asymmetric similarity/distance computation.

A Binary Embedding Techniques

Exemplary binary embedding techniques which may be employed in S102, where the elements $h_k$ of the binary multidimensional embedding function h are each a composition of a multidimensional real-valued embedding function $g_k$ and a multidimensional quantization function $q_k$, include locality sensitive hashing, spectral hashing, semi-supervised hashing, locality-sensitive binary codes, and principal component analysis (PCA) embedding. These techniques are now described with reference to a suitable comparison (similarity or distance) measure for each. The similarity/distance measure is one which provides computed similarities (or distances) which are in close agreement with what would be achieved by comparing the objects themselves.

1 Locality Sensitive Hashing (LSH)

In LSH, the functions $h_k$ are called hash functions and are selected to approximate a similarity function sim in the original space $\Omega=\mathbb{R}^D$ where D is the number of dimensions in the space (such as 3 or 4 times the number of pixels in the case of color images). Valid hash functions $h_k$ must satisfy the LSH property:

$$Pr=[h_k(x)=h_k(y)]=\text{sim}(x,y) \quad (2)$$

As an example, consider the case where sim is the cosine similarity for which a suitable hash function is as follows:

$$h_k(x) = \sigma(r'_k x) \quad (3)$$

$$\text{with } \sigma(u) = \begin{cases} 0 & \text{if } u < 0 \\ 1 & \text{if } u \geq 0, \end{cases}$$

where u represents $(r'_k x)$ and $r'_k x$ is the dot product between the random direction $r_k$ and the input vector. See, for example, M. Charikar. Similarity estimation techniques from rounding algorithms. In *ACM Symp. on Theory of Computing* (2002).

The vectors $r_k \in \mathbb{R}^D$ are drawn from a multi-dimensional Gaussian distribution p with zero mean and identity covariance matrix $I_D$. Therefore, $q_k(u)=\sigma(u)$ and $g_k(x)=r'_k x$. In such a case, a suitable distance measure in the intermediate space between $g(x)$ and $g(y)$ is the Euclidean distance as it can be shown that random Gaussian projections approximately preserve the Euclidean distance. Indeed, for two vectors x and y, the expected squared Euclidean distance between their projections is:

$$\mathbb{E}_{r\sim p}[\|r'x - r'y\|^2] = \mathbb{E}_{r\sim p}[\|r'(x-y)\|^2] \quad (5)$$

$$= \mathbb{E}_{r\sim p}[(x-y)'rr'(x-y)] \quad (6)$$

$$= (x-y)'\mathbb{E}_{r\sim p}[rr'](x-y) \quad (7)$$

and $\mathbb{E}_{r\sim p}[rr']=I_D=$ by definition of p. This leads to:

$$\mathbb{E}_{r\sim p}[\|r'x-r'y\|^2]=\|(x-y)\|^2, \quad (8)$$

and therefore the Euclidean distance is preserved in the intermediate space.

The previous LSH analysis can be readily extended beyond vectorial representations to the Kernelized LSH approach as the Mercer kernel between two objects is just a dot product in another space using a non-linear mapping $\phi(x)$ of the input vectors. For further details on the Kernelized LSH approach, see B. Kulis and K. Grauman, "Kernelized locality-sensitive hashing for scalable image search," in *Proc. 12th Int'l Conf. on Computer Vision (ICCV)*, 2009.

2 Spectral Hashing (SH)

Given a similarity function sim between objects in $\Omega=\mathbb{R}^D$, and assuming that the distribution of objects in $\Omega$ may be suitably described by a probability density function p, then SH attempts to minimize the following objective function with respect to h:

$$\int_{x,y}\|h(x)-h(y)\|^2\text{sim}(x,y)p(x)p(y)dxdy, \quad (9)$$

subject to the following constraints:

$$h(x) \in \{-1,1\}^K \quad (10)$$

$$\int_x h(x)p(x)dx=0, \quad (11)$$

$$\int_x h(x)h(x)'p(x)dx=I_D. \quad (12)$$

For further details on spectral hashing, see Y. Weiss, A. Torralba, and R. Fergus, "Spectral hashing," in *NIPS* (2008).

As optimizing Equation (9) under the constraint of Equation (10) is an NP hard problem (even in the case where K=1, i.e., of a single bit), it is possible to optimize a relaxed version of the problem, i.e., remove constraint (10), and then binarize the real-valued output at 0. This is equivalent to minimizing:

$$\int_{x,y}\|g(x)-g(y)\|^2\text{sim}(x,y)p(x)p(y)dxdy, \quad (13)$$

with respect to g under the constraints:

$$\int_x g(x)p(x)dx=0, \quad (14)$$

$$\int_x g(x)g(x)'p(x)dx=I_D. \quad (15)$$

and then writing $h(x)=2\sigma(g(x))-1$ i.e., $q(u)=2\sigma(u)-1$

The solutions to the relaxed problem are eigenfunctions of the weighted Laplace-Beltrami operators for which there exists a closed-form formula in certain cases (e.g. sim is the Gaussian kernel and p is uniform).

Minimizing Equation (13) enforces the requirement that the Euclidean distance between $g(x)$ and $g(y)$ be inversely correlated with the similarity sim(x,y) in the original space. If sim is the Gaussian kernel, this shows that a suitable distance measure in the intermediate space is the Euclidean distance in the case of SR 3 Semi-Supervised Hashing (SSH)

Let $x_i$, $i=1 \ldots N$ be a set of points in $\Omega=\mathbb{R}^D$. SSH assumes the availability of supervisory information in the form of labeled matching and non-matching pairs (see, for example, J. Wang, et al., "Semi-supervised hashing for large scale search," in *IEEE Conf. on Computer Vision & Pattern Recognition* (June 2010)). Using the notations of Wang, et al., assume two sets M and C. A pair $(x_i, x_j) \in M$ if $x_i$ and $x_j$ are considered similar (neighbor pair) and $(x_i, x_j) \in C$ if $x_i$ and $x_j$ are considered dissimilar (non-neighbor pair).

The functions $h_k$ are of the form:

$$h_k(x_i)=\text{sign}(w'_k x_i), \quad (16)$$

i.e., $q(u)=2\sigma(u)-1$ and $g_k(x)=w'_k x_i$. The goal is to learn the set $W=\{w_k, k=1 \ldots K\}$ which maximizes the following objective function:

$$J(W)=\Sigma_{(x_i,x_j)\in M}h(x_i)'h(x_j)-\Sigma_{(x_i,x_j)\in C}h(x_i)'h(x_j) \quad (17)$$

subject to the constraints:

$$\sum_{i=1}^{N} h_k(x_i) = 0, \forall k \quad (18)$$

$$\frac{1}{N}\sum_{i=1}^{N} h(x_i)h(x_i)' \quad (19)$$

Again, this is an NP-hard problem and it is possible to relax the binary assumption both in the objective function and the constraint. This leads to the following objective function:

$$J(W)=\Sigma_{(x_i,x_j)\in M}g(x_i)'g(x_j)-\Sigma_{(x_i,x_j)\in C}g(x_i)'g(x_j)+\eta R(W) \quad (20)$$

where R(W) is a regularization function which arises from the relaxation of constraint Eqn. (18) and η is a parameter which strikes a balance between the two terms. If η is small (η≈0), the relaxed objective function expresses the fact that an attempt is made to maximize the dot-product between neighbor points while minimizing the dot-product between non-neighbor points in the intermediate space. This shows that, for small η values, a suitable measure of similarity in the intermediate space for SSH is the dot-product. If η is large (η→∞), the relaxed objective function becomes equivalent to the PCA objective function which preserves the Euclidean distance. This shows that, for large η values, a suitable measure of distance in the intermediate space for SSH is the Euclidean distance.

4 Locality-Sensitive Binary Codes (LSBC)

Consider a Mercer kernel $K_M: \mathbb{R}^D \times \mathbb{R}^D$ that satisfies the following properties for all points x and y.

1. It is translation invariant: $K_M(x,y)=K(x-y)$.
2. It is normalized: i.e., $K_M(x,y) \leq 1$ and $K_m(0)=1$.
3. $\forall_\alpha \in R: \alpha \leq 1, K_M(\alpha x - \alpha y) \leq K_M(x,y)$.

Two well-known examples of such a kernel are the Gaussian kernel $K_M(x,y)=\exp(-\gamma\|x-y\|^2/2)$ and the Laplacian kernel, $K_M(x,y)=\exp(-\gamma\lceil x-y \rceil/2)$. It has been shown that for such kernels, $K_M(x,y)$ can be approximated by the Hamming similarity $H_a(h(x),h(y))$ with $h_k(x)=q_k(g_k(x))$ and:

$$g_k(x)=\cos(w'_k x + b_k), \quad (21)$$

$$g_k(u)=\sigma(u-t_k). \quad (22)$$

where $b_k$ and $t_k$ are random values drawn respectively from unif$[0,2\pi]$ and unif$[-1,+1]$. The vectors $w_k$ are drawn from a distribution $\rho_K$ which depends on the particular choice of the kernel $K_M$. For instance, if $K_M$ is the Gaussian kernel with bandwidth γ, then $p_K$ is a Gaussian distribution with a mean of zero and covariance matrix of $\gamma I_D$. As the size of the binary embedding space increases, $1-H_a(h(x), h(y))$ converges to $K_M(x,y)$. (see, M. Raginsky and S. Lazebnik, "Locality-sensitive binary codes from shift-invariant kernels," in NIPS, 2009).

It is also known that the embedding g is such that $g(x)'g(y)$ is (approximately) proportional to $K_M(x,y)$. Once again, the quality of the approximation increases with the size of the embedding space (see, A. Rahimi and B. Recht, "Random features for large-scale kernel machines," in NIPS, 2007). This shows that in the case of LSBC, a suitable measure of similarity is the dot-product. Having the property $K_M(x,x)= K_M(x-x)=K_M(0)=1=$, this shows moreover that the norm $\|g(x)\|$ is (approximately) constant and equal to 1, $\forall x$. In such a case, the dot-product is equivalent to the Euclidean distance and the Euclidean distance is also a suitable measure of comparison in the intermediate space.

5 PCA Embedding (PCAE)

Another embedding technique, which is referred to herein as principal component analysis embedding (PCAE), is as follows:

$$g_k(x)=w'_k(x-\mu) \quad (23)$$

$$q_k(u)=\sigma(u), \quad (24)$$

where μ is the data mean and $w_k$ is the eigenvector associated with the k-th largest eigenvalue of the data correlation matrix. The real-valued embedding functions are therefore the projections of the input vector on the principal directions of variation of the data.

Equations (23) and (24) can be readily extended to kernel PCA (kPCA). Results from this method have been shown to be good, despite its relative simplicity.

B. Proposed Asymmetric Distances

In section A, it has been shown that several binary embedding functions $h_k$ can be decomposed into real-valued embedding functions $h_k$ and quantization functions $q_k$. It has also been shown that there exists a suitable measure of similarity or distance in the intermediate space. Let d represent this comparison (distance or similarity) measure between samples x and y (x is assumed non-binarized while y is binarized).

The following notation is used for simplicity: let d denote both the distance between the vectors g(x) and g(y), i.e., d: $\mathbb{R}^K \times \mathbb{R}^K \to \mathbb{R}$, and the distance between the individual dimensions, i.e., d: $\mathbb{R} \times \mathbb{R} \to \mathbb{R}$.

The distance between a query image and a database image can be computed in the intermediate real-valued space as follows:

$$d(g(x), g(y))=\Sigma_k d(g_k(x), g_k(y)) \quad (25)$$

Two approximations of this quantity will now be described. In the following, x is assumed non-binarized, i.e., there is access to the values $g_k(x)$ (and therefore also to $h_k(x)$) while y is binarized, i.e., there is only access to the values $h_k(y)$ (but not to $g_k(y)$).

1 Expectation-Based Approximation of the Distance Between the Real-Valued Representation of the Query Object ($g_k(x)$) and the Real-Valued Representation of Database Object ($g_k(y)$))

As noted above, x is assumed non-binarized to provide g(x) while y is binarized and known only by its quantized representation h(y). To estimate d(g(x), g(y)), it is assumed that the samples in the original space Ω are drawn from a distribution p. The following asymmetric expectation-based approximation $d_E$ can be computed between samples x and y:

$$d_E(x,y)=\Sigma_k d(g_k(x), E_{u \sim p}[g_k(u) h_k(u)=h_k(y)]) \quad (26)$$

In Eqn (26), $d(g_k(x) E_{u \sim p}[g_k(u) h_k(u)=h_k(y)])$ is the distance in the intermediate space between $g_k(x)$ and the expected value of the samples $g_k(u)$ such that $h_k(u)=h_k(y)$ and E is the expectation operation. Since generally there is no access to the true distribution p, the expectation operator can be approximated by a sample average. In practice, for a given dimension k, a first set of samples $U_k^0$ can be randomly drawn from Ω such that $h_k(u_i)=0$ and a second set of samples $U_k^0$ such that $h_k(u_i)=1$.

The following expected values 17 are compute offline:

$$\alpha_k^0 = \frac{1}{|U_k^0|} \sum_{u \in U_k^0} g_k(u) \quad (27)$$

$$\alpha_k^1 = \frac{1}{|U_k^1|} \sum_{u \in U_k^1} g_k(u) \quad (28)$$

These values are thus average values for $g_k(y)$ when $h_k(y)$ is 0 and 1, respectively.

Online, for a given query object x, the following query-dependent values are pre-computed as the distance from the query object to the expected values $\alpha_k^0$ and $\alpha_k^1$.

$$\beta_k^0 = d(g_k(x), \alpha_k^0) \quad (29)$$

$$\beta_k^1 = d(g_k(x), \alpha_k^1) \quad (30)$$

These values are stored in look-up tables. Then the distance $d_E(x, y)$ between a query object x and a database object y can be computed as a sum over k as follows:

$$d_E(x, y)=\Sigma_k \beta_k^{h_k(y)} \quad (31)$$

where $\beta_k^{h_k(y)}$ is $\beta_k^0$ if $h_k(y)=0$ and equals $\beta_k^1$ if $h_k(y)=1$.

The cost of pre-computing the β values for each value of k can typically be neglected with respect to the cost of computing many $d_E(x, y)$'s for a large number of database objects y. Note that the sum (31) can be efficiently computed, e.g. grouping the dimensions in blocks of 8 and having one 256-dimensional look-up table per block (rather than one 2-dimensional look-up table per dimension). This reduces the number of summations by a factor 8 (as well as the number of accesses to the memory) and therefore speeds-up computation significantly.

2 Lower-Bound-Based Approximation of the Distance

A lower-bound on Eqn. (25) is now provided as an approximation of the distance between x and y in the real-valued space. Here, it is assumed that d is a distance, not a similarity. Again, x is assumed non-binarized while y is binarized. For simplicity, it can be assumed that $q_k$ has the form $q_k(u)=\sigma(u-t_k)$, where $t_k$• is the quantization threshold of the quantization function. However, this can be easily generalized to other quantization functions. If $h_k(x)=h_k(y)$ then $d(g_k(x),g_k(y))\geq 0$. In practice, this is always true. If $h_k(x)\neq h_k(y)$, then $d(g_k(x),g_k(y))\leq d(g_k(x), t_k)$. Hence, the lower-bound on $d(q(x), g(y))$ is:

$$d_{LB}(x, y)=\Sigma_k \bar{\delta}_{h_k(x),h_k(y)} d(g_k(x), t_k) \quad (32)$$

where $\bar{\delta}_{h_k(x),h_k(y)}=\bar{\delta}_{i,j}$ is the negation of the Kronecker delta, i.e., $\delta_{i,j}=0$ if i=j and 1 otherwise.

It can be shown that, despite its simplicity, this bound leads to excellent results on a variety of binary embedding schemes.

This method requires no offline computation of expected values. Online, for a given query object x, the following query-dependent values can be pre-computed:

$$\gamma_k^0 = \bar{\delta}_{h_k(x),0} d(g_k(x), t_k) \quad (33)$$

$$\gamma_k^1 = \bar{\delta}_{h_k(x),1} d(g_k(x), t_k) \quad (34)$$

One of these two values is guaranteed to be 0 for each dimension k. These values can be assembled as blocks of 8 dimensions for faster computation as is the case of the expectation-based estimation. A major difference between this lower-bound based approach and the expectation-based approach is that the latter makes use of the data distribution.

The exemplary method is thus not limited to a particular embedding method but can find application in any binary embedding technique which has an intermediate embedding space in which the query object can be represented.

Without intending to limit the scope of the exemplary embodiment, the following examples demonstrate application of the exemplary method.

EXAMPLES

Two datasets were employed. The first one is the publicly available NIST Structured Forms dataset (NIST Structured Forms Database (NIST Special Database 2), available at www.nist.gov/ts/msd/srd/nistsd2.cfm). This database consists of 5,590 binary documents from 20 different classes of tax forms. The second dataset is an in-house dataset that contains 10,274 images in thirteen different classes. This dataset is more heterogeneous than NIST and the documents include scientific proposals, forms (different from those of NIST), coupons, and handwritten letters, among others.

The documents are described with 1,680-dimensional run-length histograms according to the method described in U.S. Pub. No. 20100092084. Their dimensionality is subsequently reduced to D=256 by means of PCA to produce original representations of the images. For the binary representations, documents (i.e., original representations generated from run-length histograms after PCA) are binarized using LSH, with a number of bits ranging from 64 to 256. Since LSH is based on random projections, each experiment has been performed 5 different times with different random projections and the results have been averaged. For the real-valued embedding of the images, the original representations generated from run-length histograms after PCA were embedded as described above using $g_k(x)=r'_k x$ to generate representations (vectors) 20, 14.

Each document is queried against the others and the goal is to retrieve the documents of the same class. Average Precision (AP) is used as a measure of accuracy. The reported result is the mean AP of all the queries.

In a first experiment, the accuracy is compared when computing:

(a) Baseline: the distance on the uncompressed vectors 20, 14, (b) Binary: when both query and database vectors are compressed (as for representation 16), and (c) Asymmetric: when only database vectors are compressed (comparing representations 20 and 16, as in the exemplary method).

Figure 4:
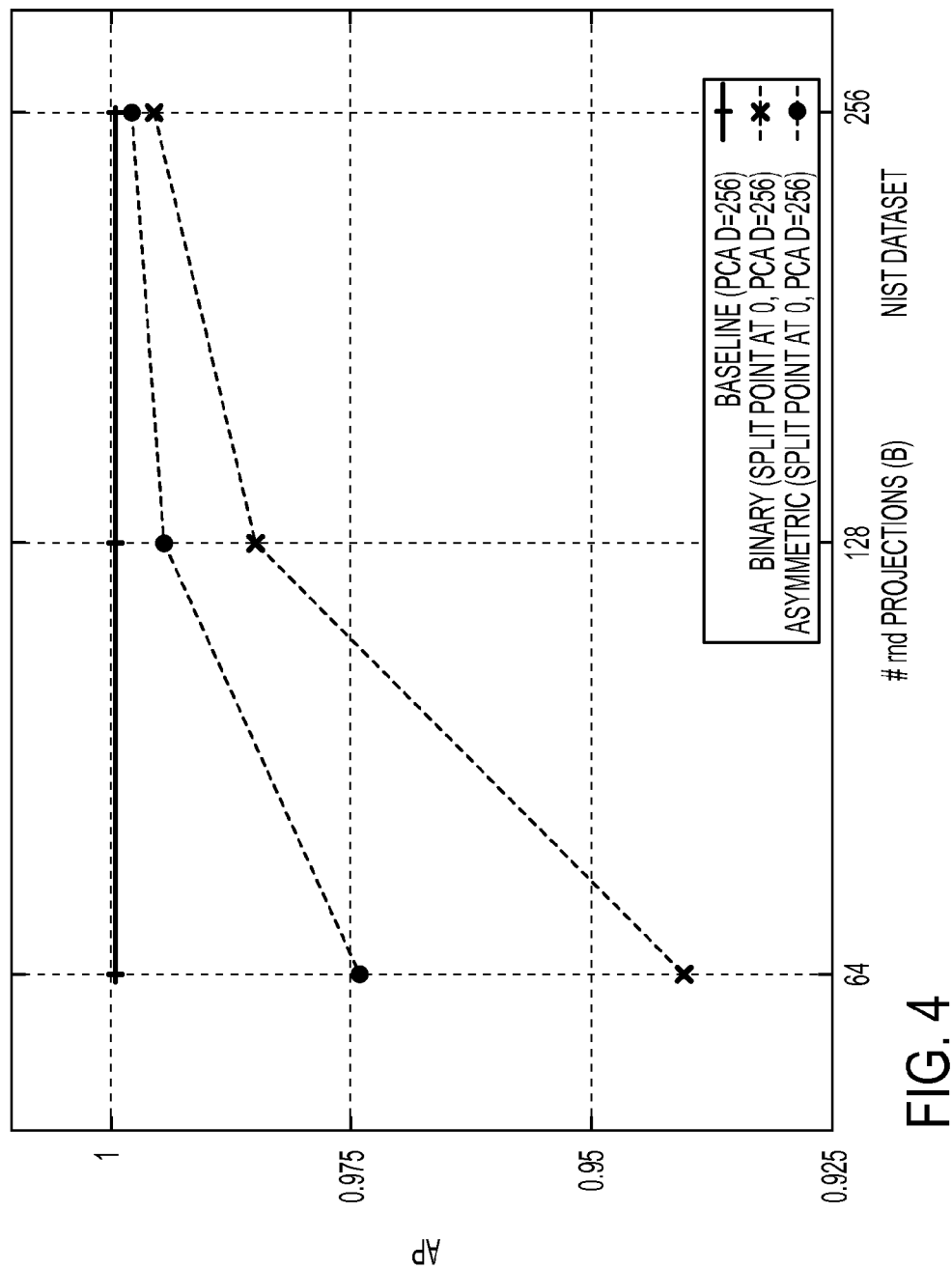
FIG. 4 shows the mean average precision (AP) obtained in experiments using documents from a NIST dataset as query and database objects, for uncompressed baseline representations (Baseline), pure binary representations using Locality Sensitive Hashing (LSH) as the embedding technique (Binary), and for the exemplary asymmetric method using LSH to embed the database documents where expected values are pre-computed on a different (in-house) dataset (Asymmetric)
Figure 5:
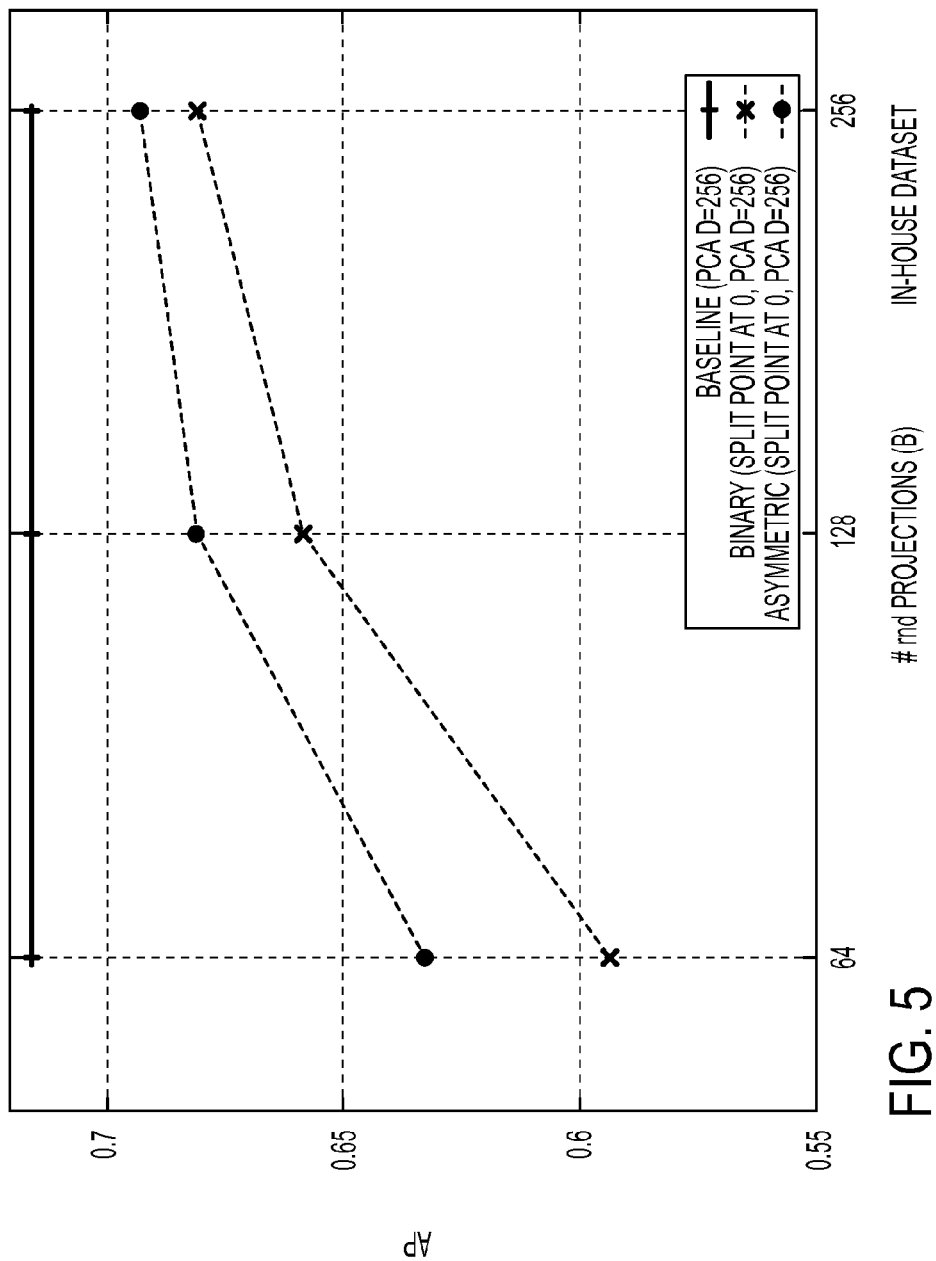
FIG. 5 shows the mean average precision (AP) obtained in experiments using documents from an in-house dataset as query and database objects, for uncompressed baseline representations (Baseline), pure binary representations using LSH as the embedding technique (Binary), and for the exemplary asymmetric method using LSH to embed the database documents where expected values are pre-computed on the NIST dataset (Asymmetric)

To show the robustness of the exemplary method, in this first set of experiments, the α values (see section B1) are computed on one dataset and then applied to the other one. The results are shown in FIGS. 4 and 5. A split point at 0 means that the quantization function $q(u)=\sigma(u)$.

It can be seen from FIGS. 4 and 5 that the exemplary method improves results significantly over the binary method, especially on the more homogeneous NIST form dataset. The Baseline comparison gives expectedly better results than the Binary and Asymmetric methods, but involves a much higher database storage requirement.

Figure 6:
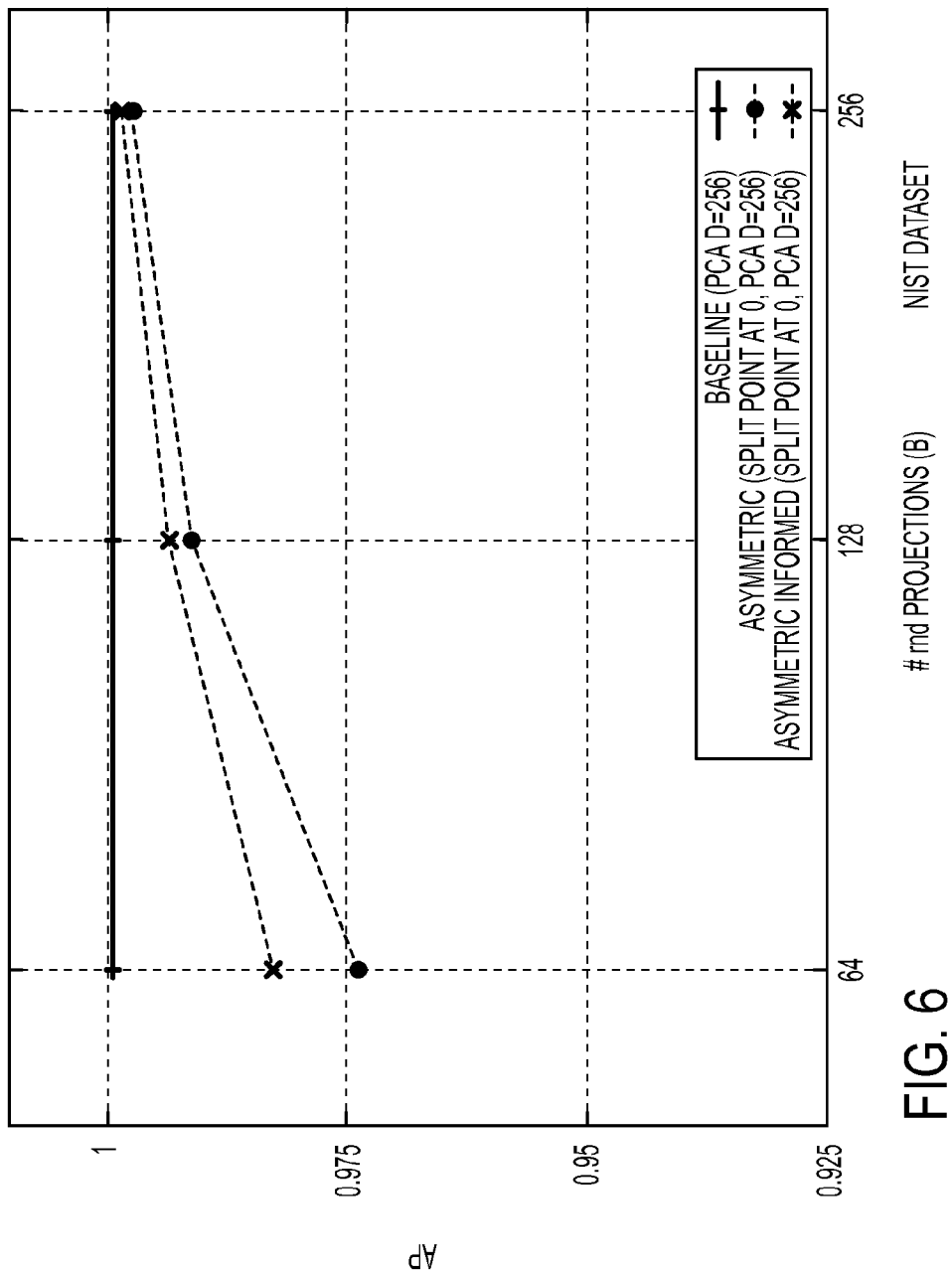
FIG. 6 shows the mean average precision (AP) obtained in experiments using documents from the NIST dataset as query and database objects, for uncompressed baseline representations (Baseline), for the exemplary asymmetric method using LSH to embed the database documents where expected values are computed on the in-house dataset (Asymmetric); and for the exemplary asymmetric method using LSH to embed the database documents where expected values are pre-computed on the NIST dataset (Asymmetric informed)
Figure 7:
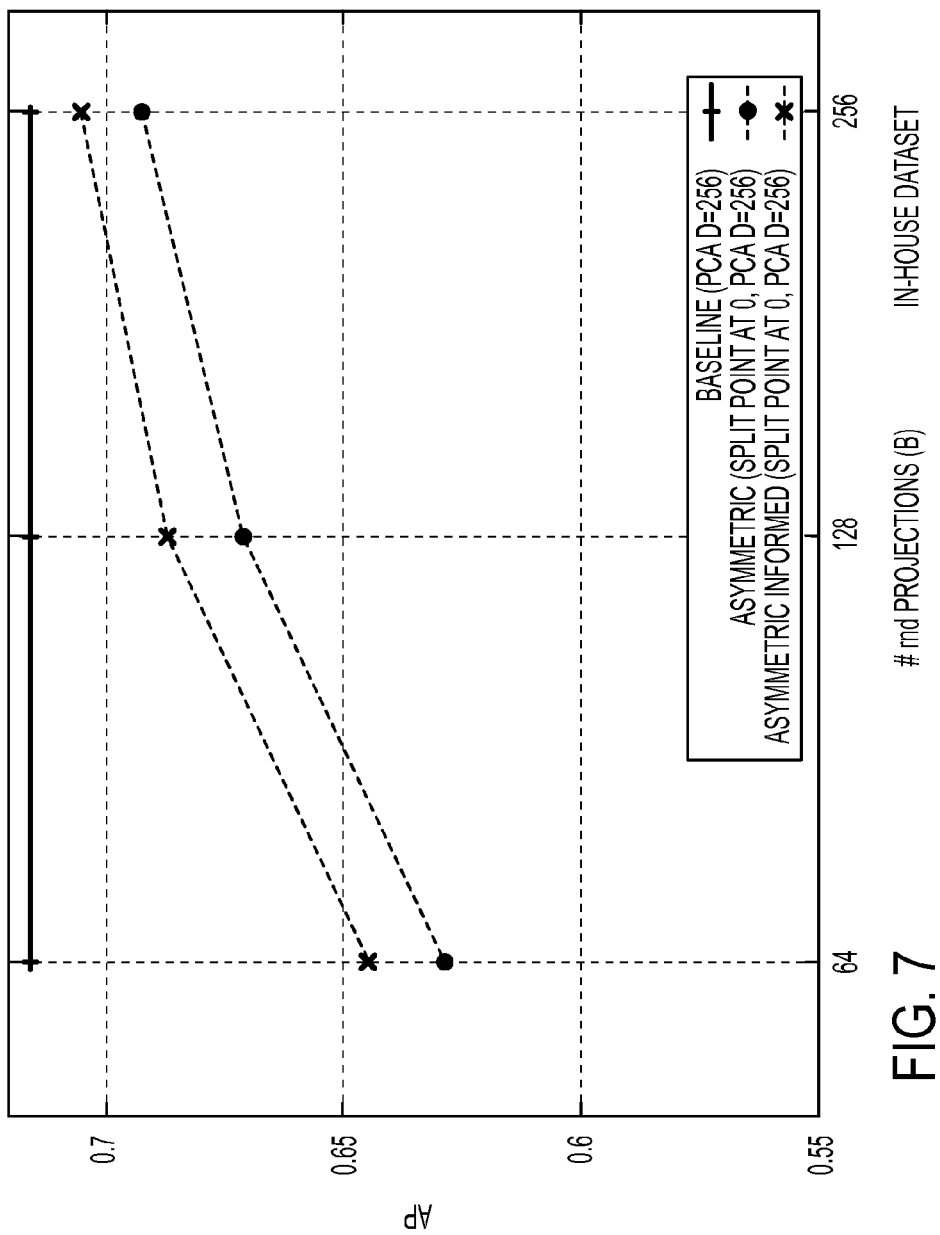
FIG. 7 shows the mean average precision (AP) obtained in experiments using documents from an in-house dataset as query and database objects, for uncompressed baseline representations (Baseline), for the exemplary asymmetric method using LSH to embed the database documents where expected values are computed on the NIST dataset (Asymmetric); and for the exemplary asymmetric method using LSH to embed the database documents where expected values are pre-computed on the same (in-house) dataset (Asymmetric informed).

In a second set of experiments analogous to those described above, the a values are learned and used on the same dataset (Asymmetric Informed) and compared to the case where these values are learned on the other dataset (Asymmetric) and the baseline results described above (Binary). FIG. 6 shows the mean AP for the NIST dataset and FIG. 7 for the in-house dataset. FIGS. 6 and 7 demonstrate that when a better a priori knowledge of the documents contained in the dataset is available, accuracy can be improved.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for comparing a query object and a set of database objects comprising:

providing quantized representations of database objects which have each been transformed with a quantized embedding function which is the composition of a real-valued embedding function and a quantization function which embeds the representations in a quantized embedding space composed of quantized values;

transforming the query object to a representation comprising a vector of k dimensions in a real-valued embedding space using the real-valued embedding function;

computing a set of query-independent expected values comprising computing, for each of the k dimensions, a first average expected value in the real-valued embedding space for a first sample of database objects having a first of the quantized values in the quantized embedding space and a second average expected value in the real-valued embedding space for a second sample of database objects having a second of the quantized values in the quantized embedding space for the dimension;

storing a set of computed query-dependent estimated distance values for the query object, based on the distance from the transformed query object to the computed set of query-independent expected values; and computing a comparison measure between the query object and each of the quantized database object representations based on the stored query-dependent estimated distance values; and outputting data based on the comparison computation.

2. The method of claim 1, wherein at least one of the transforming of the query object, storing, and computing is performed with a computer processor.

3. The method of claim 1, wherein the quantized embedding function is a multidimensional quantized embedding function.

4. The method of claim 1, wherein the storing of the set of computed query-dependent expected distance values comprises computing the set of query-dependent expected distances as a function of the set of query-independent expected values and transformed query object.

5. A computer-implemented system for comparing a query object and a set of database objects comprising:

memory which stores a set of database objects which have each been transformed with a quantized embedding function which is the composition of a real-valued embedding function and a quantization function;

an input which receives a query object;

a representation generation component which transforms the query object to a representation in a real-valued intermediate space using the real-valued embedding function but not the quantization function;

memory which stores a set of computed query-dependent estimated distance values based on the representation of the query object in the real-valued intermediate space;

instructions stored in memory for computing a comparison measure in the real valued intermediate space between the query object and each of the quantized database objects based on the stored query-dependent estimated distance values; and a processor for executing the instructions.

6. The method of claim 1, wherein the computing of the comparison measure between the query object and each of the quantized database objects comprises computing the query-dependent expected distance values as a function of a distance between the representation and the first and second average expected values for each dimension.

7. The method of claim 1, wherein the distance between the query object and a database object in the set is represented by a sum, over all dimensions in the real-valued space, of the distance between each query object and an expected value of the database object, the expected value being based on the quantized database object.

8. The method of claim 1, wherein the computing a comparison measure between the query object and each of the quantized database objects is lower-bound-based.

9. The method of claim 8, wherein the lower-bound-based computing of the comparison measure between the query object and each of the quantized database objects comprises computing and summing lower-bound-based values in each dimension of the real-valued embedding space.

10. The method of claim 9, wherein the lower-bound value in a given dimension is equal to:

zero if the quantized representation of the database object and a quantized representation of the query object have a same bit value in the quantized space, and otherwise is a distance between the query value in the intermediate real-valued space and a quantization threshold of the quantization function in the real-valued space.

11. The method of claim 8, wherein the lower-bound-based computing of the comparison measure between the query object and each of the quantized database objects comprises computing a lower bound on a distance between the query object x and each database object y according to the expression:

$$d_{LB}(x, y) = \Sigma_k \bar{\delta}_{h_k(x),h_k(y)} d(g_k(x), t_k) \quad (32)$$

where $\bar{\delta}_{h_k(x),h_k(y)}$ is the negation of the Kronecker delta, such that $\bar{\delta}_{h_k(x),h_k(y)}=0$ if $h_k(x)=h_k(y)$ and 1 otherwise; $h_k(x)$ is a quantized representation of the query object;

k is a dimension of a multi-dimensional embedding function;

$h_k(y)$ is the quantized representation of the database object;

$d(g_k(x),t_k$ is a distance between the real-valued representation of the query object $g_k(x)$; and $t_k^\bullet$ is the quantization threshold of the quantization function.

12. The method of claim 1, wherein the quantization function is a binary embedding function.

13. The method of claim 1, wherein the quantization function is selected from the group consisting of locality sensitive hashing (LSH), spectral hashing (SH), semi-supervised hashing (SSH), locality-sensitive binary codes (LSBC), and principal component analysis embedding (PCAE).

14. The method of claim 1, wherein the query object and the database objects are selected from the group consisting of images, videos, text, sound recordings, and combinations thereof.

15. A system for performing the method of claim 1, comprising non-transitory memory which stores instructions for performing the method and a processor, in communication with the memory for executing the instructions.

16. A method for comparing a query object and a set of database objects comprising:

providing quantized representations of database objects which have each been transformed with a quantized embedding function which is the composition of a real-valued embedding function and a quantization function;

transforming the query object to a representation in a real-valued embedding space using the real-valued embedding function;

storing a set of computed query-dependent estimated distance values for the query object, based on the transformed query object; and computing a comparison measure between the query object and each of the quantized database object representations based on the stored query-dependent estimated distance values;

outputting data based on the comparison computation;

wherein:

a) the quantization functions $q_k^\bullet$ are computed by locality sensitive hashing (LSH), and wherein the real-valued embedding functions $g_k$ comprise random projections ($r'_k x$) of the original space query object as the dot product between the random direction $r_k$ and the input vector x;

b) the quantization functions are computed by spectral hashing (SH), and wherein the real-valued embedding functions are of the form $\cos(a_k w'_k x)$ where $w_k$ is a principal direction of the data and $a_k$ is computed using the analytical form of Laplacian eigenfunctions, c) the quantization functions are computed by semi-supervised hashing (SSH), and wherein the real-valued embedding function are projections on a set of learned vectors $w_k(w'_k x_i)$;

d) the quantization functions are computed by locality-sensitive binary codes (LSBC), and wherein the real-valued embedding functions are cosine functions on shifted random projections $(\cos(w'_k x + b_k))$; or e) the quantization functions are computed by principal component analysis embedding (PCAE), and wherein the real-valued embedding functions are projections of the mean-centered input vector on the principal directions of variation of the data $(w'_k(x-\mu))$.

17. A computer program product comprising a non-transitory recording medium encoding instructions which, when executed by a computer, performs the method of claim 1.

18. The system of claim 5, wherein the representation of the query object in the real-valued intermediate space comprises a vector having k dimensions, the set of computed query-dependent estimated distance values being computed as a function of a set of query-independent expected values, and wherein the set of query-independent expected values comprise, for each dimension k, a first average expected value for a first of the quantized values and a second average expected value for a second of the quantized values, computed from a training set of database objects.

19. A method for comparing digital objects, comprising:
providing quantized representations of database objects which have each been transformed with a quantized embedding function which is the composition of a real-valued embedding function and a quantization function;
generating a query object representation for a query object in a real-valued intermediate space using real-valued embedding functions but not the quantization function;
providing a set of computed query-dependent estimated distance values based on the representation of the query object in the real-valued intermediate space;
converting the quantized representation of the database objects into estimated database object representations in the real-valued intermediate space; and
computing a comparison measure between the query object and the database objects in the real-valued intermediate space based on the estimated database object representations and the query-dependent estimated distance values.

20. The method of claim 19, wherein at least one of the generating, converting, and computing is performed with a computer processor.

21. A computer program product comprising a non-transitory recording medium encoding instructions which, when executed by a computer, performs the method of claim 19.

22. A method for comparing a query object and a set of database objects comprising:
providing quantized representations of database objects which have each been transformed with a quantized embedding function which is the composition of a real-valued embedding function and a quantization function;
transforming the query object to a representation in a real-valued embedding space using the real-valued embedding function;
storing a set of computed query-dependent estimated distance values for the query object, based on the representation of the query object in the real-valued embedding space; and
computing a comparison measure between the query object and each of the quantized database object representations based on the stored query-dependent estimated distance values, the computing of the comparison measure between the query object and each of the quantized database objects being lower-bound-based and wherein the lower-bound-based computing of the comparison measure between the query object and each of the quantized database objects comprises computing a lower bound on a distance between the query object and each database object wherein the lower-bound-based computing of the comparison measure between the query object and each of the quantized database objects comprises computing a lower bound on a distance between the query object x and each database object y according to the expression:

$$d_{LB}(x, y) = \Sigma_k \bar{\delta}_{h_k(x), h_k(y)} d(g_k(x), t_k) \quad (32)$$

where $\bar{\delta}_{h_k(x), h_k(y)}$ is the negation of the Kronecker delta, such that $\bar{\delta}_{h_k(x), h_k(y)} = 0$ if $h_k(x) = h_k(y)$ and 1 otherwise;

$h_k(x)$ is a quantized representation of the query object;

k is a dimension of a multi-dimensional embedding function;

$h_k(y)$ is the quantized representation of the database object;

$d(g_k(x), t_k$ is a distance between the real-valued representation of the query object $g_k(x)$; and $t_k$• is the quantization threshold of the quantization function; and outputting data based on the comparison computation.

* * * * *